S. M. Richardson,
Hinge Die.
N° 24,330. Patented June 7, 1859.
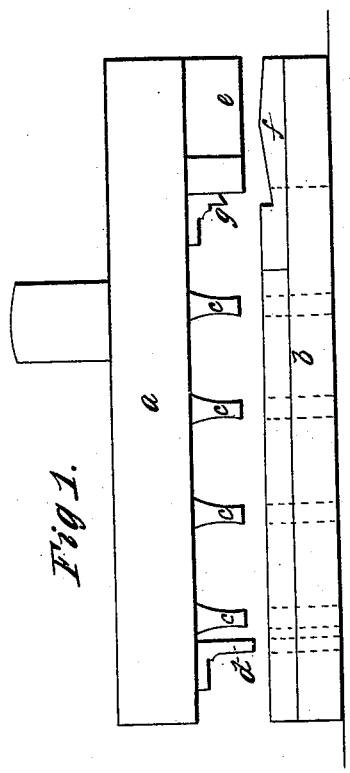
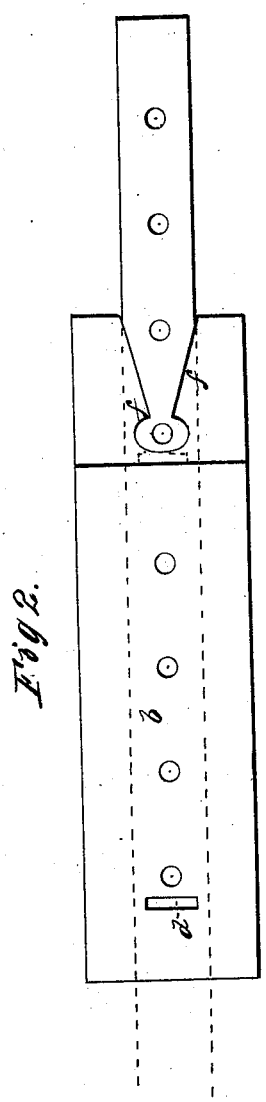
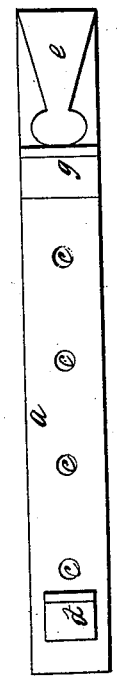
Witnesses.
Lemuel W. Serrell
Thomas G. Harold
Inventor.
S. M. Richardson

UNITED STATES PATENT OFFICE.

SAMUEL M. RICHARDSON, OF NEW YORK, N. Y.

CUTTING OUT STRAP-HINGES.

Specification of Letters Patent No. 24,330, dated June 7, 1859.

*To all whom it may concern:*

Be it known that I, SAMUEL M. RICHARDSON, of the city, county, and State of New York, have invented, made, and applied to use a certain new and useful Improvement in Dies for Cutting Out Strap-Hinges; and I do hereby declare that the following is a full, clear, and exact description of the construction and operation of the same, reference being had to the annexed drawing, making part of this specification, wherein—

Figure 1 is a side elevation of said dies. Fig. 2, is a plan of the lower die and Fig. 3 is a plan of the upper die.

Similar marks of reference denote the same parts.

In the manufacture of strap hinges it has been usual heretofore to cut a strip of metal up into the lengths required for the leaves, next to punch the screw holes, and lastly to point or shape the end of the strap, thus requiring three operations of handling.

The nature of my said invention consists in constructing dies in such a manner that as a strip of metal is fed into the press, the first blow punches the screw holes and also a relieving hole which partially separates the strip at the point where the complete separation afterward occurs, so that when said strip is slid along a gage distance for the punches again to operate, a cutter (at one point of the dies) completes the separation of the first hinge from the strip while a properly formed die cuts the end of the hinge into the desired shape and the relieving hole previously punched coming at the end of the hinge, separates the two pieces of scrap, allowing them to fall freely away from the press.

In the drawing $a$, is the upper die block attached to any suitable press, and $b$, is the lower die adjusted on the bed as usual.

$c, c, c$, are the punches forming the screw holes.

$d$, is the relieving punch of any desired shape acting to perforate the strip of metal at the part which comes between the end of one hinge leaf, and the commencement of the next. Said strip of metal is passed along between guides as shown by dotted lines.

The die $e$, acts in the counter $f$, to form and shape the end of the hinge by cutting off a piece on each side of the strip. This scrap would adhere around the die $e$, or obstruct the press were it not for the relieving hole formed by the die $d$, so that as the cutter $g$, completes the separation the two pieces of scrap fall away without obstructing the press: and the end of the strip is cut off square at the end of the next leaf.

By this device, one leaf of a strap hinge is formed each stroke of the press although performed by two successive operations, the press is relieved of its scrap, and all that is needed is to feed in the strip of metal, and all subsequent handling is avoided until the leaf is completed.

What I claim as my invention and desire to secure by Letters Patent is—

The relieving die $d$, in combination with the shaping die $f$, and cutter $g$, in the manner and for the purposes specified.

In witness whereof I have hereunto set my signature this seventh day of March 1859.

S. M. RICHARDSON.

Witnesses:
LEMUEL W. TERRELL,
THOMAS G. HAROLD.